(12) United States Patent
Fernandez et al.

(10) Patent No.: US 11,485,226 B2
(45) Date of Patent: Nov. 1, 2022

(54) TRANSMISSION DEVICE FOR A MOTOR VEHICLE

(71) Applicant: Schaeffler Technologies AG & Co. KG, Herzogenaurach (DE)

(72) Inventors: Inaki Fernandez, Nuremberg (DE); Harald Martini, Herzogenaurach (DE); Thorsten Biermann, Wachenroth (DE); Philip Wurzberger, Nuremberg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/292,622

(22) PCT Filed: Oct. 14, 2019

(86) PCT No.: PCT/DE2019/100886
§ 371 (c)(1),
(2) Date: May 10, 2021

(87) PCT Pub. No.: WO2020/098860
PCT Pub. Date: May 22, 2020

(65) Prior Publication Data
US 2022/0001744 A1 Jan. 6, 2022

(30) Foreign Application Priority Data
Nov. 16, 2018 (DE) .................. 10 2018 128 836.0

(51) Int. Cl.
*F16H 37/08* (2006.01)
*B60K 17/16* (2006.01)
(Continued)

(52) U.S. Cl.
CPC .............. *B60K 17/165* (2013.01); *B60K 1/00* (2013.01); *F16H 37/082* (2013.01); *F16H 48/11* (2013.01);
(Continued)

(58) Field of Classification Search
CPC ............................... F16H 48/11; F16H 37/082
See application file for complete search history.

(56) References Cited

U.S. PATENT DOCUMENTS

| 10,920,864 | B2* | 2/2021 | Voelkel | ................. F16H 37/082 |
| 2015/0045170 | A1* | 2/2015 | Ohmura | ................. F16H 48/42 475/221 |
| 2015/0377334 | A1* | 12/2015 | Swales | .................. B60K 17/16 475/220 |

FOREIGN PATENT DOCUMENTS

| DE | 102015110040 | 12/2015 |
| DE | 102015214035 | 1/2017 |

(Continued)

*Primary Examiner* — Derek D Knight

(57) ABSTRACT

A transmission device for a motor vehicle includes a planetary gearset and a spur gear differential. The planetary gearset includes a drive sun gear, a ring gear fixed to the housing, and multiple stepped planetary gears. Each stepped planetary gear has a first gear meshing with the drive sun gear and a second gear meshing with the ring gear. The spur gear differential includes multiple first and second compensation gears. Each first compensation gear meshes with a first output sun gear, each second compensation gear meshes with a second output sun gear, and the first and second compensation gears mesh with each other in pairs. One compensation gear of each compensation gear pair is arranged in phase with a respective stepped planetary gear. The other compensation gear of each compensation gear pair overlaps axially and contactlessly with the second gear.

14 Claims, 2 Drawing Sheets

(51) Int. Cl.
*B60K 1/00* (2006.01)
*F16H 48/11* (2012.01)
*F16H 57/08* (2006.01)

(52) U.S. Cl.
CPC ...... *B60K 2001/001* (2013.01); *F16H 57/082* (2013.01); *F16H 2702/02* (2013.01)

(56) References Cited

FOREIGN PATENT DOCUMENTS

| | | |
|---|---|---|
| EP | 2821672 | 1/2015 |
| WO | 2017016552 | 2/2017 |

* cited by examiner

TRANSMISSION DEVICE FOR A MOTOR VEHICLE

CROSS-REFERENCE TO RELATED APPLICATIONS

This application is the U.S. National Phase of PCT Appln. No. PCT/DE2019/100886 filed Oct. 14, 2019, which claims priority to DE 10 2018 128 836.0 filed Nov. 16, 2018, the entire disclosures of which are incorporated by reference herein.

TECHNICAL FIELD

The disclosure relates to a transmission device for a motor vehicle and a drive device having such a transmission device. In particular, the motor vehicle is driven electrically.

BACKGROUND

EP 2 821 672 B1 discloses a drive device for a vehicle, comprising a first drive shaft and a second drive shaft, the axial ends of which are opposite one another so that they are arranged coaxially. Furthermore, the drive device comprises a differential mechanism that has a first sun gear connected to the first drive shaft, a second sun gear connected to the second drive shaft, a first pinion meshing with the first sun gear, a second pinion meshing with the second sun gear and the first pinion, and a carrier that rotatably supports the first pinion and the second pinion. Further, a speed reducing mechanism is provided which has an input sun gear connected to an input shaft, a first reduction pinion meshing with the input sun gear and rotatably supported by the carrier, a second reduction pinion connected to the first reduction pinion and rotatably supported by the carrier, and a ring gear meshing with the second reduction pinion. Furthermore, a housing encloses the differential mechanism and the reduction mechanism, which are arranged coaxially to one another, wherein the housing rotatably supports the carrier and receives the ring gear in a rotationally fixed manner. The second reduction pinion of the reduction mechanism and the first and second pinion of the differential mechanism are arranged out of phase in a rotating direction. Further, the second reduction pinion of the reduction mechanism and the first and second pinion of the differential mechanism are arranged at a position in an axial direction such that at least one of the first pinion and the second pinion of the differential mechanism overlaps with the second reduction pinion of the reduction mechanism.

SUMMARY

It is desirable to create an alternative transmission device.

A transmission device for a motor vehicle comprises a planetary gear with a drive sun gear, with a ring gear fixed to the housing and with multiple stepped planetary gears, each of which has a first and a second gear that are rotationally fixed to each other, wherein the first gear meshes with the drive sun gear, and the second gear meshes with the ring gear, and a spur gear differential transmission with a first and second output sun gear and multiple first and second compensation gears, wherein the first compensation gears mesh with the first output sun gear, wherein the second compensation gears mesh with the second output sun gear, and each first and second compensation gear mesh with each other in pairs, wherein all of the stepped planetary gears and all of the compensation gears are rotatably mounted at least indirectly on a common planet carrier, wherein a compensation gear of a respective compensation gear pair is arranged in phase with a respective stepped planetary gear, wherein the respective compensation gear which is not arranged in phase with the respective stepped planetary gear overlaps axially and contactlessly with the second gear.

In other words, the first gears of the stepped planetary gears together with the drive sun gear form an input stage, wherein the second gears of the stepped planetary gears together with the ring gear form a load stage. The two compensation gears of the spur gear differential transmission form the differential stage. The spur gear differential transmission is configured to distribute a drive power introduced into the transmission device via the drive sun gear to the first and second output sun gear. The drive sun gear can be connected to a drive machine via a drive shaft, wherein the respective output sun gear is connectable to a respective wheel of the motor vehicle via a respective output shaft. The two output shafts form a drive axle of the motor vehicle. In particular, the drive shaft is intended to be connected to an electric drive machine in order to implement an electric axle drive.

Because the two output sun gears have the same outer diameter, the spur gear differential transmission is designed symmetrically. The two sun gears preferably have the same axial width. In particular, the two output sun gears are identical and thus designed to be identical in construction.

The planetary transmission and the spur gear differential transmission are coupled to one another via the planet carrier. All stepped planetary gears and all compensation gears are at least indirectly accommodated on the planet carrier so as to be rotatable, for example via further bearing elements. In particular, the planet carrier is designed in two parts, wherein the two planet carrier halves are then rotationally fixed to each other.

A compensation gear pair is formed from a first and a second compensation gear, wherein the two compensation gears of the respective compensation gear pair mesh with one another. Two meshing gears are provided to transmit a torque and a rotational speed from one gear to the other gear. The term "gear" may refer, for example, to a compensation gear, a sun gear, a ring gear or a gear of a stepped planetary gear.

Because a compensation gear of a respective compensation gear pair is arranged in phase with a respective stepped planetary gear, this respective compensation gear of the respective compensation gear pair has no angular displacement in the circumferential direction relative to the respective stepped planetary gear. In particular, the compensation gear of a respective compensation gear pair, which is arranged in phase with a respective stepped planetary gear, is located on a pitch circle of the respective stepped planetary gear.

The respective compensation gear which is not arranged in phase with a respective stepped planetary gear overlaps axially and contactlessly with the second gear. The respective compensation gear which is not arranged in phase with a respective stepped planetary gear, penetrates axially into a region of the stepped planetary gear, in particular in a region of the second gear and the ring gear, wherein neither the gear nor the ring gear are touched by these compensation gears. The compensation gear is displaced in the circumferential direction to the stepped planetary gear. Thus, the respective compensation gear which is not arranged in phase with a respective stepped planetary gear has an angular displacement in the circumferential direction, wherein this compensation gear is arranged outside a pitch circle of the respective stepped planetary gear.

The respective compensation gear which is arranged in phase with the respective stepped planetary gear may be formed coaxially with the respective stepped planetary gear and is arranged together with the respective stepped planetary gear on a common bearing element. In particular, the respective stepped planetary gear, like the respective compensation gear, which is arranged in phase with the respective stepped planetary gear, is rotatably mounted on a bolt, wherein the bolt is received on the planet carrier in a rotationally fixed manner. The bolt is preferably designed as a hollow bolt.

The respective compensation gear, which is not arranged in phase with the respective stepped planetary gear, is preferably mounted on the common planet carrier via pins formed thereon. The pins are formed on the end face and extend centrally and axially from the said compensating gear outwards into recesses provided for this purpose for holding the pins. In particular, the two pins are integrally connected to said compensation gear, wherein said compensation gear has no axial borehole.

In particular, the two output sun gears have the same number of teeth. The number of teeth of an output sun gear is to be understood as the number of teeth on the outer circumferential surface of the output sun gear.

The first compensation gears preferably have different numbers of teeth than the second compensation gears. For example, the number of teeth on the first compensation gears is greater than the number of teeth on the second compensation gears. Alternatively, the number of teeth of the first compensation gears may be smaller than the number of teeth of the second compensation gears. The number of teeth of a compensation gear is to be understood as the number of teeth on the outer circumferential surface of the compensation gear. In particular, the compensation gears are designed with straight teeth.

The number of first compensation gears may be equal to the number of second compensation gears and equal to the number of stepped planetary gears, wherein at least three stepped planetary gears are provided. Thus, a total of at least six compensation gears are provided, of which three first compensation gears and three second compensation gears are provided. The total of six compensation gears form three compensation gear pairs. The number of pairs of compensation gears corresponds to the number of stepped planetary gears.

A drive device for a motor vehicle comprises an electric drive machine which is operatively connected to a transmission device via a drive shaft. For this purpose, the drive shaft is connected to the drive sun gear in a rotationally fixed manner. The electric drive machine comprises a stator and a rotor, wherein the rotor is connected to the drive shaft in a rotationally fixed manner. Consequently, the drive shaft is designed as a rotor shaft.

BRIEF DESCRIPTION OF THE DRAWINGS

Further measures are shown in more detail below together with the description of an exemplary embodiment. In the figures.

DETAILED DESCRIPTION

Figure 5:
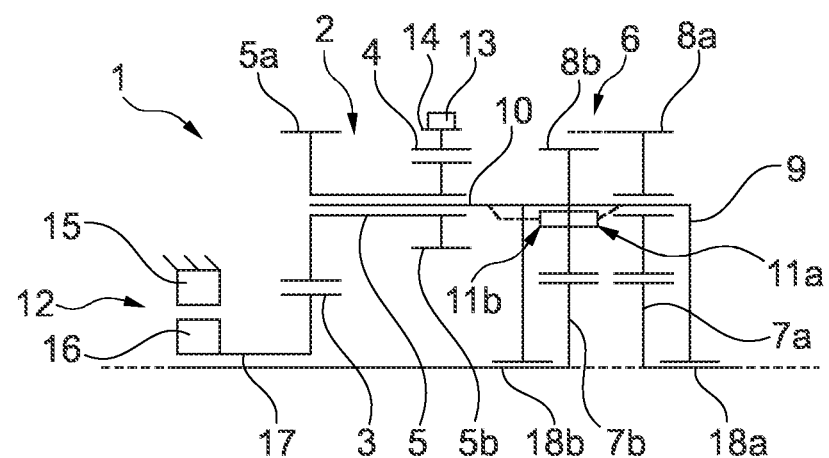
FIG. 5 shows a greatly simplified schematic view to illustrate the structure of a drive device with the transmission device according to FIGS. 1 to 4.

In FIGS. 1, 2, 3 and 4, a transmission device 1 for a motor vehicle is shown. FIG. 5 shows a drive device with an electric drive machine 12 and the transmission device 1 according to FIGS. 1 to 4. Depending on the respective perspective and the respective section, not all components of the transmission device 1 are shown in each figure.

According to FIGS. 1 to 5, the transmission device 1 has a planetary gearset 2 and a spur gear differential transmission 6. The planetary gearset 2 comprises a drive sun gear 3, a ring gear 4 fixed to the housing and multiple stepped planetary gears 5, each of which has a first and a second gear 5a, 5b that are rotationally fixed to each other. The first gear 5a meshes with the drive sun gear 3, and the second gear 5b meshes with the ring gear 4. The ring gear 4 is connected in a rotationally fixed manner to a housing 13 of the transmission device 1. The housing 13 is only shown in a simplified manner in FIG. 5. In the FIGS. 1 to 4, a plug-in gearing 14 is shown on the outer circumferential surface of the ring gear 4. The ring gear 4 is connected in a rotationally fixed manner to the housing 13 via the plug-in gearing 14.

Figure 1:
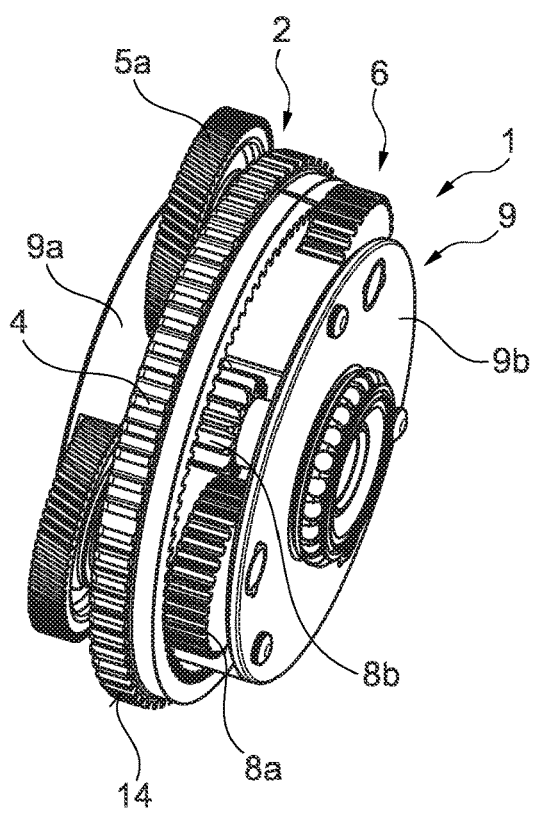
FIG. 1 shows a schematic perspective view to illustrate the structure of a transmission device.
Figure 2:
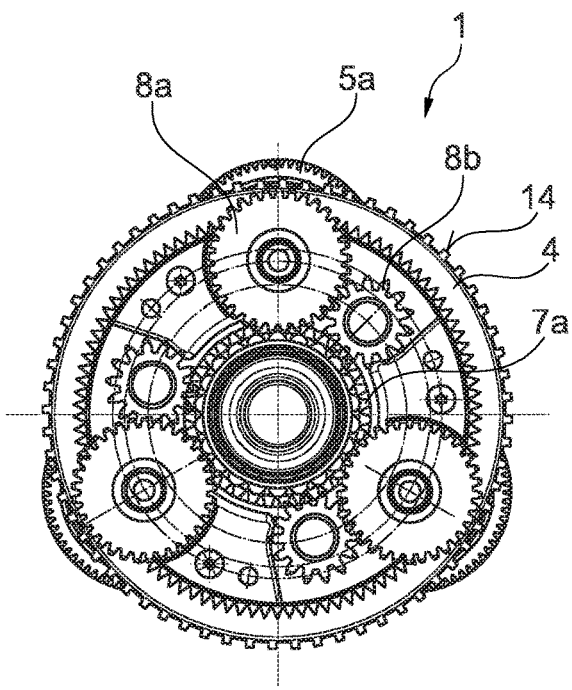
FIG. 2 shows a schematic side view of the transmission device according to FIG. 1.
Figure 3:
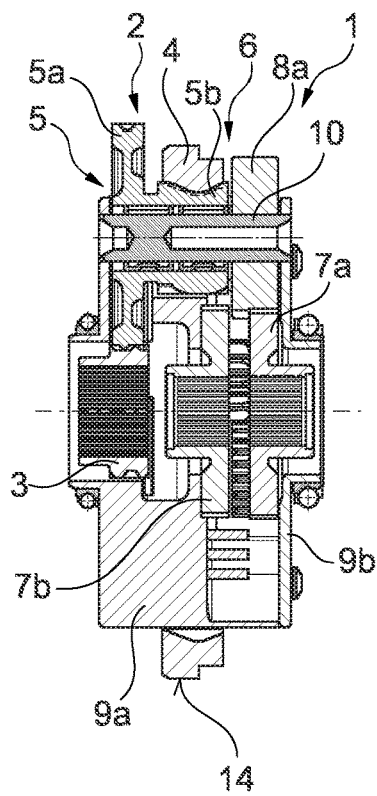
FIG. 3 shows a schematic cross-sectional view of the transmission device according to FIGS. 1 and 2.
Figure 4:
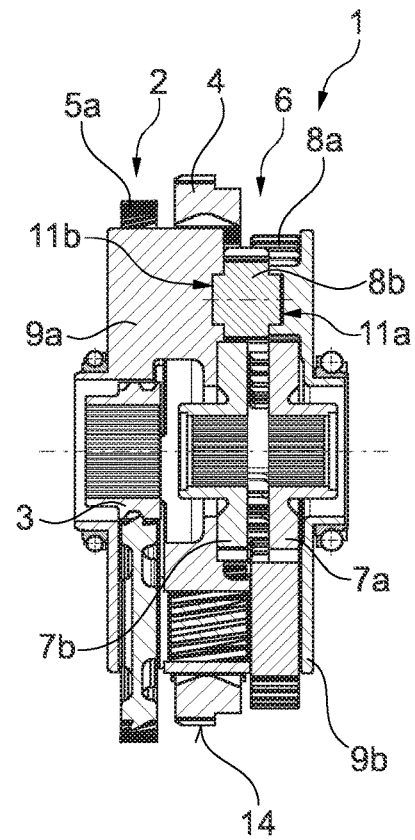
FIG. 4 shows a further schematic sectional view of the transmission device according to FIGS. 1 to 3.

The spur gear differential transmission 6 comprises a first and second output sun gear 7a, 7b and multiple first and second compensation gears 8a, 8b. The first compensation gears 8a mesh with the first output sun gear 7a. The second compensation gears 8b mesh with the second output sun gear 7b. Furthermore, each first and second compensation gear 8a, 8b mesh with one another in pairs and thereby form a compensation gear pair 8a, 8b. All of the stepped planetary gears 5 and all of the compensation gears 8a, 8b are rotatably mounted at least indirectly on a common planet carrier 9, wherein the planet carrier has a first and a second planet carrier half 9a, 9b, that are rotationally fixed to each other. In FIG. 2, the second planet carrier half 9b is not shown for an improved plan view of the compensation gear pairs 8a, 8b. The first compensation gear 8a of a respective compensation gear pair 8a, 8b is arranged in phase with a respective stepped planetary gear 5. The respective compensation gear 8a which is arranged in phase with the respective stepped planetary gear 5 is formed coaxially with the respective stepped planetary gear 5 and is arranged together with the respective stepped planetary gear 5 on a common bearing element 10, in this case designed as a hollow bolt.

In the present case, the two output sun gears 7a, 7b have the same number of teeth. The two output sun gears 7a, 7b have the same outside diameter and the same widths. The spur gear differential transmission 6 is thus symmetrical. Furthermore, the first compensation gears 8a have a higher number of teeth than the second compensation gears 8b. All compensation gears 8a, 8b are designed with straight teeth. In contrast, the gears 5a, 5b of the stepped planetary gears 5 are designed with helical teeth. The number of first compensation gears 8a is equal to the number of second compensation gears 8b and equal to the number of stepped planetary gears 5, wherein in this case three stepped planetary gears 5 are provided.

The respective second compensation gear 8b which is not arranged in phase with a respective stepped planetary gear 5 overlaps axially and contactlessly with the second gear 5*b*. The axial overlap of the second compensation gear 8*b* with the second gear 5*b* and in particular also the ring gear 4, which meshes with the second gear 5*b*, is shown particularly clearly in FIGS. 3 and 4. It should be noted that FIG. 5 is shown in a greatly simplified manner, wherein an axial overlap of the second compensation gear 8*b* with the second gear 5*b* from FIG. 5 is not evident due to the simplified view. The respective second compensation gear 8*b* which is not arranged in phase with the respective stepped planetary gear 5 is mounted on the common planet carrier 9 via two pins 11*a*, 11*b* formed thereon. These pins 11*a*, 11*b* are shown particularly clearly in FIGS. 4 and 5.

According to FIG. 5, the electric drive machine 12 comprises a stator 15 and a rotor 16, wherein the rotor 16 is connected in a rotationally fixed manner with the drive shaft 17. Furthermore, the drive shaft 17 is connected to the drive sun gear 3 in a rotationally fixed manner. The respective output sun gear 7*a*, 7*b* is connected in a rotationally fixed manner to a respective output shaft 18*a*, 18*b*. The drive shaft 17 is arranged coaxially to the two output shafts 18*a*, 18*b*, wherein the drive shaft 17 is designed as a hollow shaft.

LIST OF REFERENCE SYMBOLS

1 Transmission device
2 Planetary gearset
3 Drive sun gear
4 Ring gear
5 Stepped planetary gear
5*a*, 5*b* Gear
6 Spur gear differential transmission
7*a*, 7*b* Output sun gear
8*a*, 8*b* Compensation gear
9 Planetary carrier
9*a*, 9*b* Planetary carrier half
10 Bearing element
11*a*, 11*b* Pins
12 Drive machine
13 Housing
14 Plug-in gearing
15 Stator
16 Rotor
17 Drive shaft
18*a*, 18*b* Output shaft

The invention claimed is:

1. A transmission device for a motor vehicle, comprising:
a planetary gearset having a drive sun gear, a ring gear fixed to a housing, and multiple stepped planetary gears, each stepped planetary gear having a first and a second gear that are rotationally fixed to each other, wherein the first gear meshes with the drive sun gear and wherein the second gear meshes with the ring gear; and
a spur gear differential having a first and a second output sun gear and multiple first and second compensation gears, wherein the first compensation gears mesh with the first output sun gear, wherein the second compensation gears mesh with the second output sun gear, and wherein each of the first compensation gears meshes with one of the second compensation gears;
wherein all of the stepped planetary gears and all of the compensation gears are rotatably mounted at least indirectly on a common planet carrier;
wherein each first compensation gear is arranged in phase with a respective stepped planetary gear;
wherein each second compensation gear overlaps axially and contactlessly with one of the second gears; and
wherein each first compensation gear is coaxial with the respective stepped planetary gear and is arranged together with the respective stepped planetary gear on a common bearing element.

2. The transmission device according to claim 1, wherein each second compensation gear is mounted on the common planet carrier via pins formed thereon.

3. The transmission device according to claim 1, wherein the first and second output sun gears have a same number of teeth.

4. The transmission device according to claim 1, wherein the first compensation gears have different numbers of teeth compared to the second compensation gears.

5. The transmission device according to claim 1, wherein the first and second compensation gears have straight teeth.

6. The transmission device according to claim 1, wherein a number of first compensation gears is equal to a number of second compensation gears and equal to a number of stepped planetary gears, wherein the number of stepped planetary gears is at least three.

7. A drive device for a motor vehicle, comprising an electric drive machine and a transmission device operatively connected therewith according to claim 1.

8. A transmission device for a motor vehicle, comprising:
a drive sun gear;
a ring gear fixed to a housing;
a carrier;
a plurality of stepped planetary gears supported for rotation with respect to the carrier, each stepped planetary gear having a first gear meshing with the drive sun gear and having a second gear meshing with the ring gear;
a first output sun gear;
a second output sun gear;
a plurality of first compensation gears, each first compensation gear supported for rotation with respect to the carrier, in phase with a respective planetary gear, and meshing with the first output sun gear; and
a plurality of second compensation gears, each second compensation gear supported for rotation with respect to the carrier, overlaps axially and contactlessly with the second gears, and meshing with the second output sun gear and one of the first compensation gears, wherein each first compensation gear is coaxial with the respective stepped planetary gear and is supported together with the respective stepped planetary gear on a common bearing element.

9. The transmission device according to claim 8, wherein each second compensation gear is mounted on the carrier via pins formed thereon.

10. The transmission device according to claim 8, wherein the first and second output sun gears have a same number of teeth.

11. The transmission device according to claim 8, wherein the first compensation gears have a greater number of teeth than the second compensation gears.

12. The transmission device according to claim 8, wherein the first and second compensation gears have straight teeth.

13. The transmission device according to claim 8, wherein a number of first compensation gears is equal to a number of second compensation gears and equal to a number of stepped planetary gears, and wherein the number of stepped planetary gears is at least three.

14. A drive device for a motor vehicle, comprising:
a transmission device according to claim 8; and
a motor having a rotor drivably connected to the drive sun gear.

* * * * *